(12) United States Patent
Hajduczenia (10) Patent No.: US 12,342,220 B2
(45) Date of Patent: *Jun. 24, 2025

(54) SYSTEM AND METHOD FOR ESTABLISHING A VIRTUAL ACCESS POINT

(71) Applicant: Charter Communications Operating, LLC, St. Louis, MO (US)

(72) Inventor: Marek Hajduczenia, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/731,521

(22) Filed: Jun. 3, 2024

(65) Prior Publication Data

US 2024/0323764 A1 Sep. 26, 2024

Related U.S. Application Data

(60) Continuation of application No. 18/350,045, filed on Jul. 11, 2023, now Pat. No. 12,035,172, which is a division of application No. 17/079,782, filed on Oct. 26, 2020, now Pat. No. 11,825,350.

(51) Int. Cl.
| | | |
|---|---|---|
| H04W 28/086 | (2023.01) | |
| H04W 48/20 | (2009.01) | |
| H04W 76/19 | (2018.01) | |
| H04W 80/02 | (2009.01) | |
| H04W 84/12 | (2009.01) | |

(Continued)

(52) U.S. Cl.
CPC ....... *H04W 28/0862* (2023.05); *H04W 48/20* (2013.01); *H04W 76/19* (2018.02); *H04W 80/02* (2013.01); *H04W 84/12* (2013.01); *H04W 88/08* (2013.01); *H04W 88/12* (2013.01)

(58) Field of Classification Search
CPC . H04W 28/0812; H04W 80/02; H04W 84/12; H04W 88/12; H04W 88/08
See application file for complete search history.

(56) References Cited

U.S. PATENT DOCUMENTS

| | | |
|---|---|---|
| 8,792,501 B1 | 7/2014 | Rustagi et al. |
| 8,798,055 B1 | 8/2014 | An |
| 10,212,087 B2 | 2/2019 | Kalkunte |

(Continued)

*Primary Examiner* — Redentor Pasia
(74) *Attorney, Agent, or Firm* — Young Basile Hanlon & MacFarlane, P.C.

(57) ABSTRACT

System and method for establishing a virtual access point (vAP) is described. A wireless network includes a router to provide access to external networks, physical access points (pAPs) to provide radio communications access to a user device, and a controller to form a vPA by layer two link aggregating the pAPs using access point and configuration information and send a virtual service set identifier (vSSID) to the pAPs. The vAP having a layer two data plane and control plane. The vAP provides a wireless coverage area equivalent to the pAPs using the vSSID, enable a user device to connect to the data plane via a data link, connect to the control place via layer two control links, and radio frequency connect to the pAPs. The controller and the pAPs configured to manage user data traffic flow between the router and the user device via the control and the data planes.

20 Claims, 8 Drawing Sheets

(51) Int. Cl.
*H04W 88/08* (2009.01)
*H04W 88/12* (2009.01)

(56) References Cited

U.S. PATENT DOCUMENTS

| | | | |
|---|---|---|---|
| 11,510,269 B2* | 11/2022 | Asterjadhi | H04W 76/15 |
| 2010/0135184 A1* | 6/2010 | Kezys | H04W 24/02 |
| | | | 370/252 |
| 2011/0038349 A1 | 2/2011 | Sun et al. | |
| 2011/0142019 A1 | 6/2011 | Bharghavan et al. | |
| 2012/0113971 A1* | 5/2012 | Giaretta | H04W 48/20 |
| | | | 370/338 |
| 2012/0236823 A1 | 9/2012 | Kompella et al. | |
| 2012/0281526 A1 | 11/2012 | Singamsetty et al. | |
| 2014/0298052 A1 | 10/2014 | Meirosu et al. | |
| 2015/0055506 A1 | 2/2015 | Birlik et al. | |
| 2015/0237002 A1* | 8/2015 | Baniqued | H04L 61/5061 |
| | | | 709/220 |
| 2015/0350974 A1* | 12/2015 | Patil | H04W 36/0085 |
| | | | 370/331 |
| 2016/0212776 A1 | 7/2016 | MacDonald et al. | |
| 2016/0285751 A1 | 9/2016 | Pang et al. | |
| 2017/0027005 A1 | 1/2017 | Sung | |
| 2017/0135145 A1 | 5/2017 | Amini et al. | |
| 2018/0084604 A1 | 3/2018 | Ou et al. | |
| 2018/0115941 A1* | 4/2018 | Wang | H04W 48/14 |
| 2018/0159790 A1 | 6/2018 | Wang et al. | |
| 2019/0014024 A1 | 1/2019 | Koshy | |
| 2019/0141708 A1 | 5/2019 | Chen et al. | |
| 2019/0327616 A1 | 10/2019 | Ganu et al. | |
| 2020/0359259 A1 | 11/2020 | Patil et al. | |
| 2021/0014911 A1 | 1/2021 | Patil et al. | |
| 2021/0219214 A1 | 7/2021 | Andonieh et al. | |
| 2021/0266998 A1 | 8/2021 | Ho et al. | |
| 2022/0053404 A1 | 2/2022 | Panje | |
| 2022/0124844 A1 | 4/2022 | Boyapalle et al. | |
| 2022/0287122 A1 | 9/2022 | Wang et al. | |
| 2022/0369403 A1* | 11/2022 | Fang | H04W 76/15 |

* cited by examiner

SYSTEM AND METHOD FOR ESTABLISHING A VIRTUAL ACCESS POINT

CROSS REFERENCE TO RELATED APPLICATION(S)

This application is a continuation of U.S. patent application Ser. No. 18/350,045, filed on Jul. 11, 2023, which is a divisional of U.S. patent application Ser. No. 17/079,782, filed on Oct. 26, 2020, both of which are incorporated herein by reference.

TECHNICAL FIELD

This disclosure relates to wireless communications. In particular, the disclosure is for enhanced wireless networks.

BACKGROUND

Multiple wireless access points (APs) are positioned in a typical premises to provide wireless coverage. A user or client device ("user device") establishes a connection with one of the multiple APs in the premises to obtain service. As the user of the user device moves around the premises, the user device performs a handoff from one AP to another AP in the premises. This typically involves a user data stream to be shifted or transferred between the two APs. This can result in service interruption including performance degradation and even loss of service. Moreover, the frequency of handoffs between APs can be aggravated due to the protocols being used by the user devices, which can lead to further service degradation.

SUMMARY

Disclosed herein is a system and method for establishing a virtual access point.

In implementations, a wireless local area network includes a router configured to provide access to external networks, a plurality of physical access points connected to the router, each physical access point configured to provide radio communications access to a user device, a controller configured to obtain access point information from each of the plurality of physical access points, form a virtual access point by layer two link aggregating the plurality of physical access points using the access point information and configuration information, the virtual access point having a layer two data plane and a layer two control plane, generate a virtual service set identifier for the virtual access point, and send the virtual service set identifier to each of the plurality of physical access points, the virtual access point configured to provide a wireless coverage area equivalent to at least the plurality of physical access points using the virtual service set identifier, enable a user device to connect to the layer two data plane via a data link, enable the user device to connect to the layer two control place via layer two control links, and enable the user device to radio frequency connect to the plurality of physical access points, and the controller and the plurality of physical access points configured to manage user data traffic flow between the router and the user device via the layer two control plane and the layer two data plane.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer", "computing device", or "computing platform" includes any unit, or combination of units, in a distributive platform, centralized platform, or combinations thereof, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, network operation, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Deployment of wireless networks or WiFi® in most applications relies on a basic service set (BSS), which can include a redistribution point together with one or more client stations, client devices, user devices, subscriber devices, and the like (collectively "user devices") that are associated with, in communication with, or connected to (collectively "connected to") the redistribution point. The redistribution point can be an access point (AP), a wireless access port (WAP), and the like (collectively "AP"). The operating parameters or service coverage provided by the wireless network are defined by the redistribution point. User devices communicate only with the redistribution point that they are associated with, and all traffic within the wireless network is routed through and/or bridged by that redistribution point.

Each BSS has its own unique identifier, a BSSID, which is a unique 48-bit identifier that follows media access control (MAC) address conventions. A BSSID is usually non-configurable, in which case it is either preset during manufacture, or mathematically derived from a preset value such as a serial number, the MAC address of the local area network (LAN) connection, and the like. As with the MAC addresses used for Ethernet devices, BSSIDs are a combination of a 24-bit Organization Unique Identifier (OUI, the manufacturer's identity) and a 24-bit serial number. A BSSID with a value of all 1s (broadcast) is used to indicate the wildcard BSSID, usable only during probe requests or for communications that take place outside the context of a BSS.

Each AP generates a service set ID (SSID), which is broadcast by the AP in beacon packets to announce the presence of the given network. SSIDs are usually customizable. SSIDs can be zero to 32 octets (32 bytes) long, and are, for convenience, usually in a natural language, such as English to facilitate the identification of the given WiFi® or wireless network instance. The 802.11 standards prior to the 2012 edition did not define any particular encoding and/or representation for SSIDs, which were expected to be treated and handled as an arbitrary sequence of 0-32 octets that are not limited to printable characters. The IEEE 802.11-2012 defines a tag that the SSID is UTF-8 encoded and when interpreting could contain any non-ISO basic Latin characters within it. Wireless network stacks must still be prepared to handle arbitrary values in the SSID field.

Figure 1:
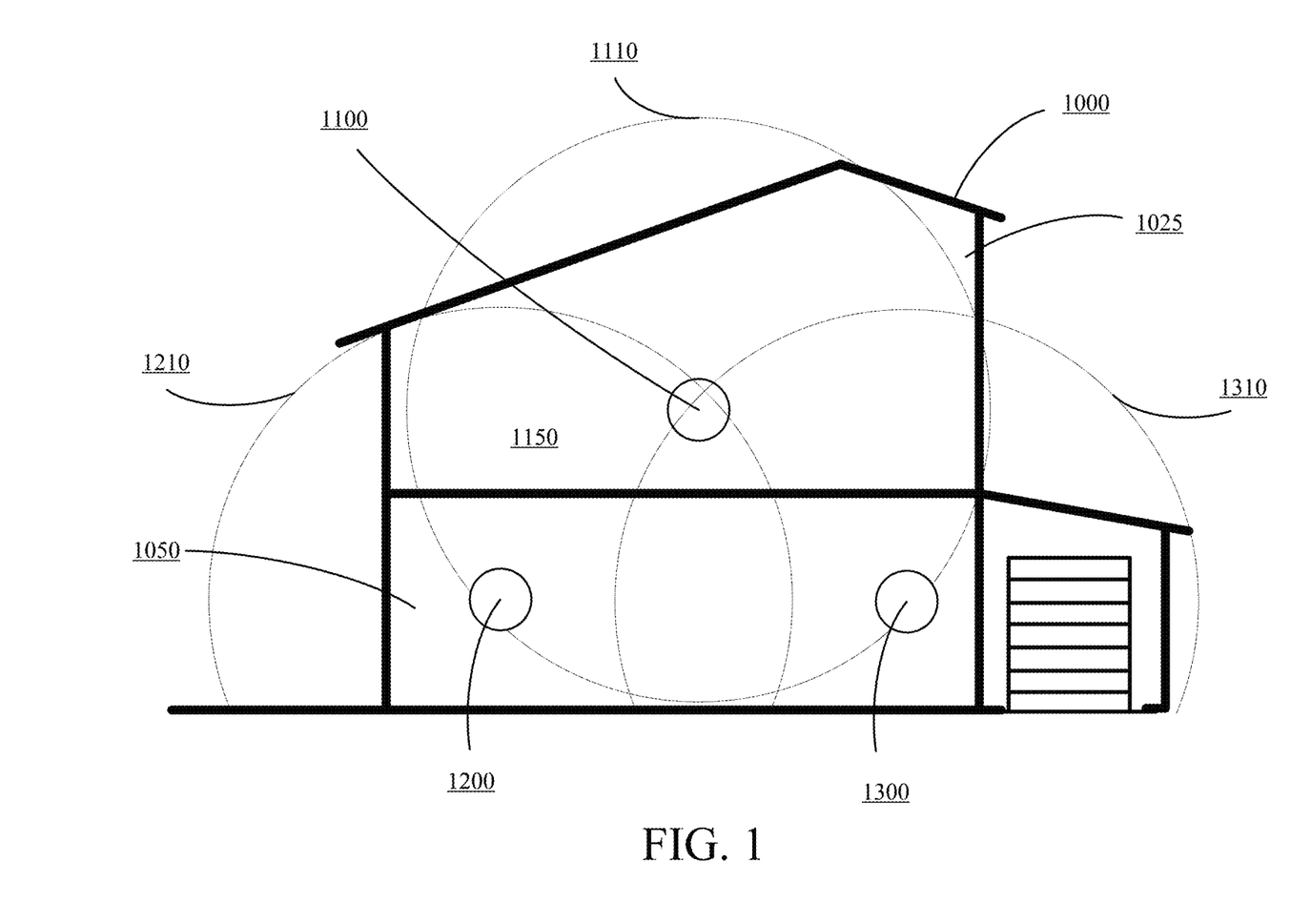
FIG. 1 is a diagram of an example premise with multiple access points.

Along with the increased data rates, WiFi® or wireless coverage area usually decreases, requiring deployment of multiple APs to cover the same geographical area (e.g., home or premises). Higher frequency signals also have issues penetrating building materials, leading to decreased signal quality when traversing multiple walls and/or floors. This leads to situation where even a single family home may need to be equipped with multiple APs. FIG. 1 is a diagram of an example premise 1000 with multiple APs 1100, 1200, and 1300 deployed on a second floor 1025 and a first floor 1050. Each of the APs 1100, 1200, and 1300 have a wireless coverage 1110, 1210, and 1310. In this case, the APs 1100, 1200, and 1300 are located in the areas with highest network traffic to provide optimum coverage and also optimize operation of individual network resources.

In typical deployments, each AP is assigned a unique SSID, requiring a user device to roam between individual APs for best coverage. For example, when a person moves from the kitchen of the first floor 1050 to the second floor 1025, the user device will roam between two different APs, for example, AP 1300 and AP 1100. During the handoff from the AP 1300 to the AP 1100, there can be a brief service interruption while individual data streams (Transmission Control Protocol (TCP sessions), for example) switch from the AP 1300 to the AP 1100.

To improve the networking experience in a multi-AP environment, extended service sets (ESSs) were created, in which individual APs are associated with a same SSID, effectively creating a single wireless network from the perspective of a user device. The handoff in this case is simplified, whereby the user device does not need to perform a full SSID discovery, termination of connection with a previous SSID, and a full connection handshake with the new SSID. There is still a physical layer handoff, where the user, client, or customer data stream needs to be shifted from one AP to another AP, causing service interruption, critical especially in case of TCP sessions. Such service interruption while customer traffic is handed off from one AP to another AP, even within the ESS, causes TCP windowing to back off, terminating individual TCP sessions (if handoff is long enough) or degrading the performance (resulting in smaller TCP windows).

The AP roaming aggressiveness also plays a major role in handoff experience. With very aggressive roaming, a user device will switch between APs frequently, causing service degradation every time the AP it is connected to is switched to a different AP. With very lax roaming, a user device will switch between APs only when the current AP signal becomes largely unusable, preferring to stay with the current AP even at the cost of connection speed and signal quality. Achieving optimum roaming aggressiveness and intra-AP handoff is a very complex topic, usually requiring complex configuration and optimization between signal strength, link quality, and handoff thresholds. Very few user devices expose any controls over roaming aggressiveness.

In dense WiFix deployments, for example, even with the ESS enabled, a basic one-to-one relationship between the user device and the AP is still featured, i.e., a user device is connected to a single AP at any time, forcing all the ingress and egress traffic for the given user device to flow through a single AP.

Figure 2:
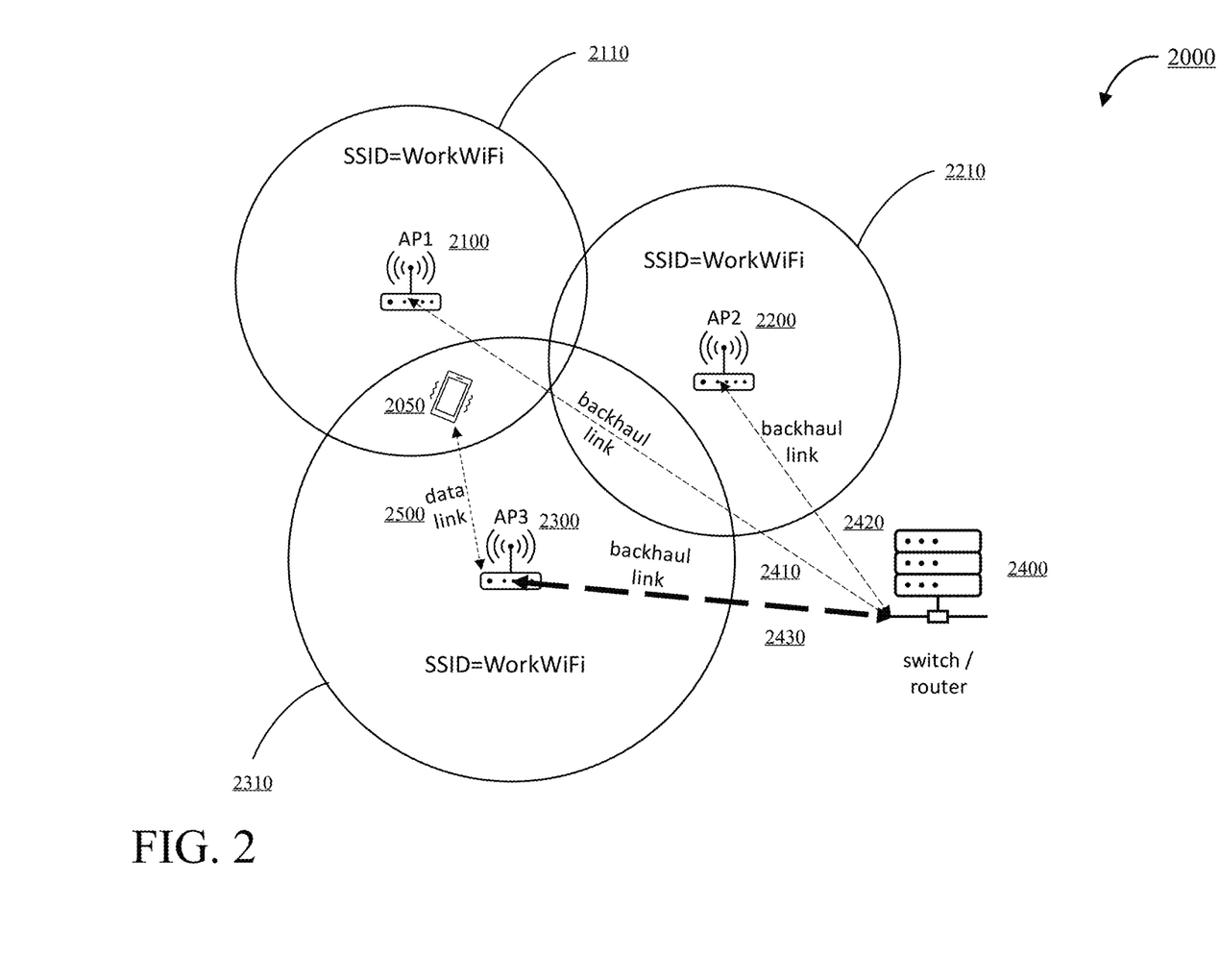
FIG. 2 is a diagram of an example user device in a wireless network with multiple access points.
Figure 3:
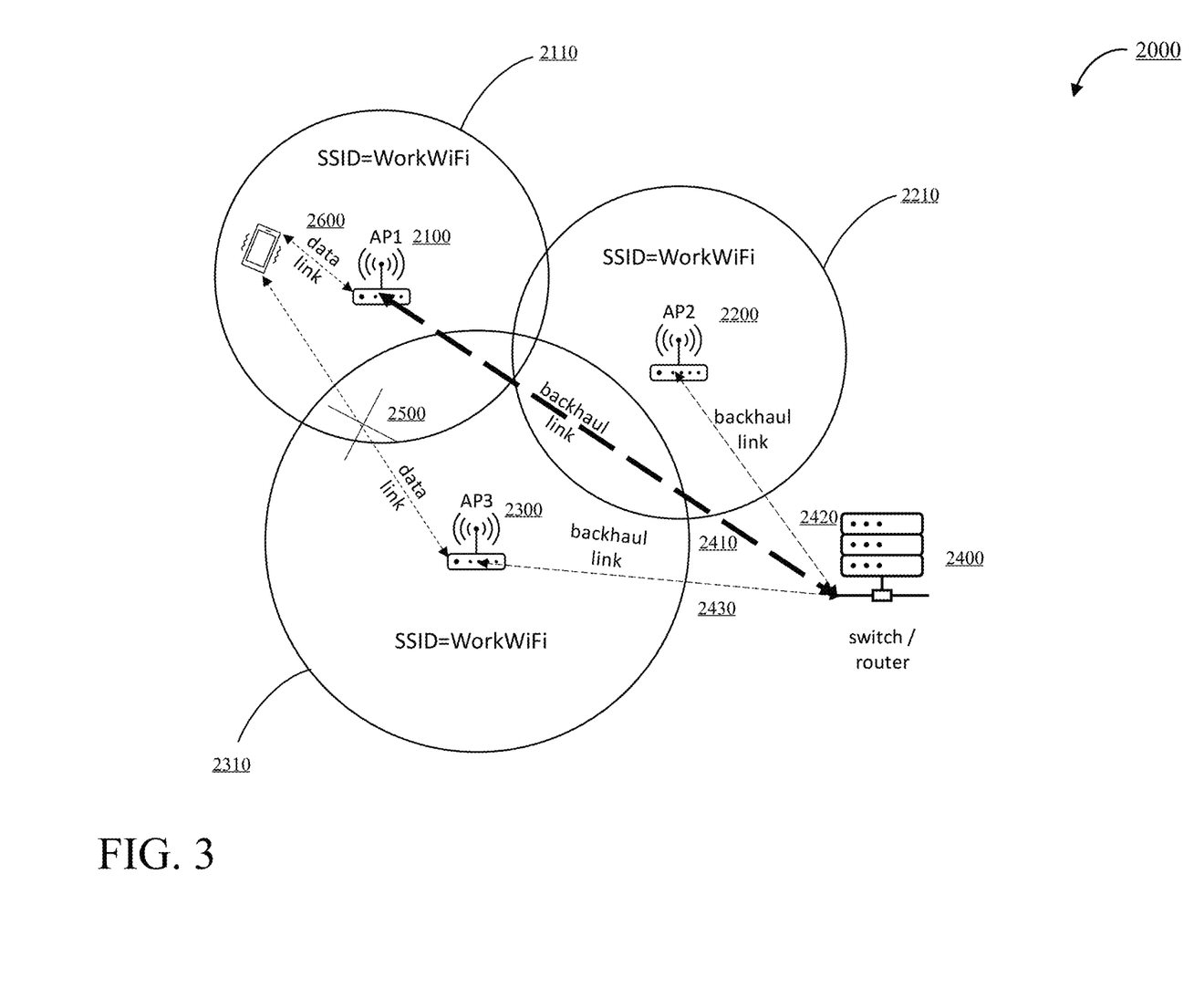
FIG. 3 is a diagram of an example of the user device of FIG. 2 moving in the wireless network.

FIG. 2 is a diagram of an example user device 2050 in a wireless network or wireless local area network (WLAN) 2000 with multiple access points and FIG. 3 is a diagram of an example of the user device of FIG. 2 moving in the wireless network. The wireless network 2000 includes AP1 2100, AP2 2200, and AP3 2300, each providing a wireless coverage 2110, 2210, and 2310, respectively. The AP1 2100, AP2 2200, and AP3 2300 are part of an ESS and share a common SSID, namely, WorkWiFi. The AP1 2100, AP2 2200, and AP3 2300 are connected to a switch and/or router 2400 via backhaul links 2410, 2420, and 2430, respectively, which provides access to external networks, the Internet, and the like. In this instance, the user device 2050 is connected to the AP3 2300 via a data link 2500 and user data is carried over the data link 2500 and the backhaul link 2430 to the switch and/or router 2400.

When changing position and roaming between APs within the ESS (all sharing the same SSID), a handoff needs to take place, where the user device switches from the one AP within the ESS to another AP within the same ESS, effectively forcing the user device traffic to start flowing through the different AP. In FIG. 3, a user moves the user device 2050 out of the wireless coverage of the AP3 2300 and into the wireless coverage of the AP1 2100. The datalink 2500 between the user device 2050 and the AP3 2300 is severed or terminated. The datalink 2600 between the user device 2050 and the AP1 2100 is established. All the user device data flows must stop flowing from the switch and/or router 2400 to AP3 2300 and to the user device 2050 and instead flow from the switch and/or router 2400 to AP1 2100 and to the user device 2050. This in turns causes re-learning in the wireless network 2000 infrastructure or backbone connecting individual APs to aggregation switches and routing infrastructure, whereby the given user device appears to start showing up as connected to a different AP, forcing traffic re-route.

Described herein is a system and method for providing a virtual AP (vAP). In implementations, a vAP is established from a set of physical APs or physical AP instances (pAPs) via a layer 2 link aggregation (L2LA) or a logical aggregation. The vAP has a virtual SSID (vSSID) which is used by user devices to connect to the vAP. The wireless coverage of the vAP is substantially equivalent to that of the individual pAPs. The L2LA mechanism provides data plane and control plane connectivity between the pAPs and a router and/or switch device. The data plane and control plane provide linkage to the individual pAPs as the user device moves within the wireless coverage area of the vAP and with respect to the wireless coverages of the pAPs. Although radio frequency (RF) connectivity can drop, the data plane and control plane among all the pAPs remains intact enabling continuous flow of user data traffic. Consequently, as long as the user device is within the wireless coverage of the vAP, the user device can send and/or receive data streams over a data plane link to the vAP. In implementations, load balancing mechanisms can be used to efficiently use multiple connected RF links and multiple backhaul links to send and/or receive the data streams.

In implementations, collective operation of individual pAPs via the control plane and the data plane L2LA mechanisms allow the vAP to elect the most effective path of delivery traffic to the connected user device. This in turn eliminates any service interruptions. In addition, traffic is no longer blindly sent through a given pAP just because it is the last pAP the user device was connected to. Instead, traffic can be proactively rerouted away from a pAP with very low quality connection to the user device, creating a much more performance-oriented link between the vAP and the user device.

In implementations, the pAPs in a given wireless network can be grouped into multiple vAPs, where each vAP can provide different wireless coverages. Subsets of pAPs can form vAPs for different purposes, such as for work, media, smart appliances, and the like.

Figure 4:
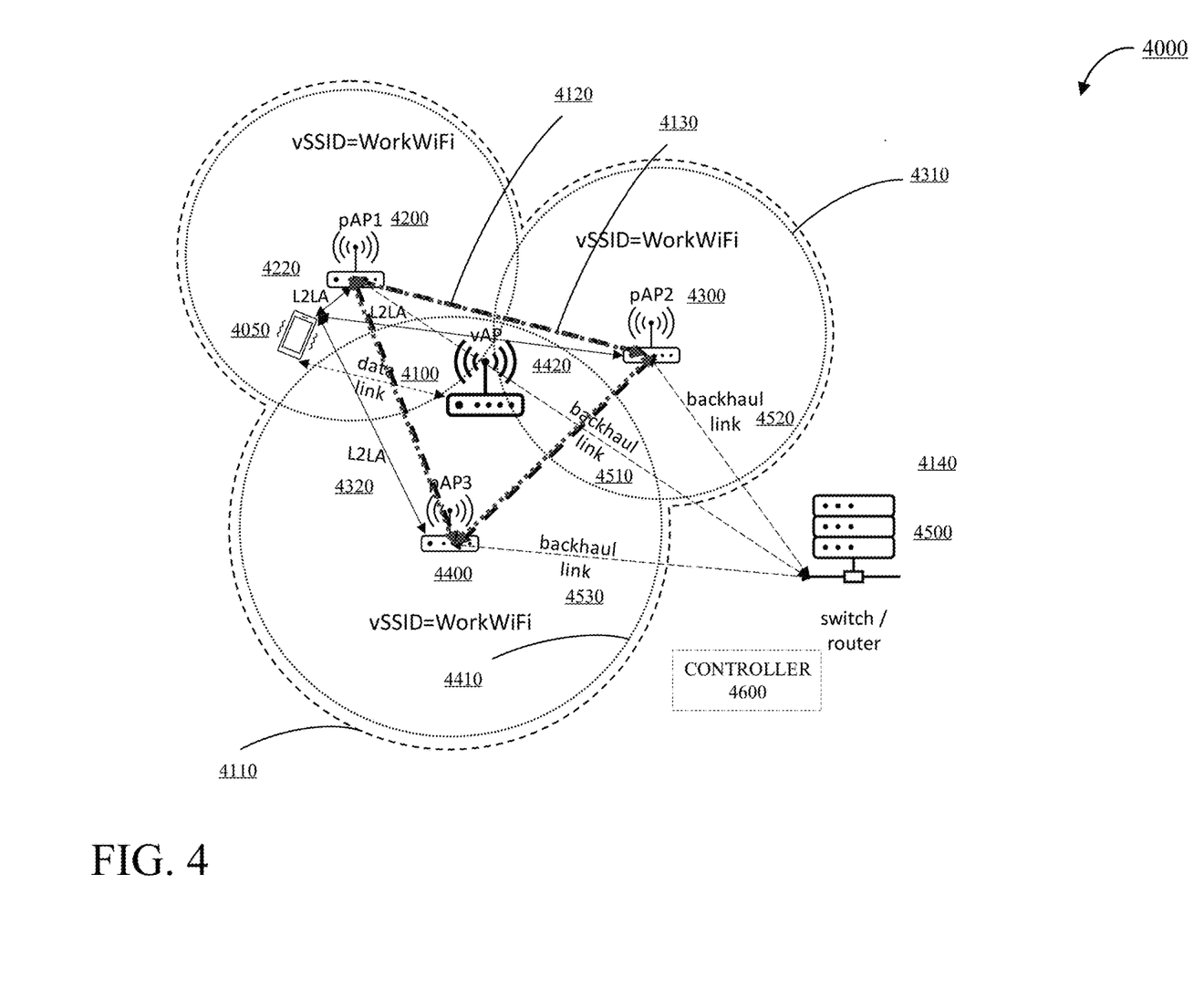
FIG. 4 is a diagram of an example of a user device in a wireless network with a virtual access point in accordance with embodiments of this disclosure.

FIG. 4 is a diagram of an example of a user device 4050 in a wireless network 4000 with a vAP 4100 in accordance with embodiments of this disclosure. The wireless network 4000 includes the vAP 4100 which is a L2LA of pAP1 4200, pAP2 4300, and pAP3 4400. Each of the pAP1 4200, pAP2 4300, and pAP3 4400 are connected to a switch and/or router 4500 via backhaul links 4510, 4520, and 4530, respectively, which provides access to external networks.

The user device 4050 can be, but is not limited to, client stations, user stations, client devices, end user devices, user equipment (UE), user termination devices, user terminals, personal computers (PCs), cellular telephones, Internet Protocol (IP) devices, computers, desktop computers, laptops, mobile devices, handheld computers, personal media devices, smartphones, notebooks, notepads, phablets and the like which can detect and connect to the vAP 4100 and to the pAP1 4200, pAP2 4300, and pAP3 4400 as described herein.

The switch and/or router 4500 can be, but is not limited to, a router, modem, cable modem, set top box, Internet Service Provider (ISP) system device, access point device, network devices, gateway, and the like which provides access to the external network.

The pAP1 4200, pAP2 4300, and pAP3 4400 can be an access point, an access node, or like device which enables radio communications access for the user device 4050 to the external network via the switch and/or router 4500. Each pAP1 4200, pAP2 4300, and pAP3 4400 can have or provide a wireless communications coverage 4210, 4310, and 4410, respectively. In implementations, a wireless mesh network or topology can be used for connectivity between the pAP1 4200, pAP2 4300, and pAP3 4400 and the switch and/or router 4500 in contrast to having each of the pAP1 4200, pAP2 4300, and pAP3 4400 being connected to the switch and/or router 4500. That is, a topology of the vAP 4100 can be implemented using a variety of networking techniques.

The vAP 4100 is a L2LA or logical aggregation of the pAP1 4200, the pAP2 4300, and the pAP3 4400. The vAP 4100 is established or generated as an abstraction of the physical level implementation of individual APs, such as the pAP1 4200, the pAP2 4300, and the pAP3 4400. The vAP 4100 has its own virtual SSID (vSSID), which is used by user devices to connect to the vAP 4100. A wireless communications coverage 4110 of the vAP 4100 includes at least the wireless communications coverages 4210, 4310, and 4410. In this instance, the vSSID is WorkWiFi and is applicable or visible in the wireless communications coverage 4110 and/or the wireless communications coverages 4210, 4310, and 4410. In terms of appearance, the vAP 4100 is functionally equivalent to a single pAP used by a user device client to connect to the wireless network. The L2LA provides the vAP 4100 with a data plane and a control plane such as, for example, control plane 4120 and data plane 4130.

The data plane 4130 is used for data connectivity, to transmit and receive user data (customer packets) as described herein. When running between pAPs, the data plane 4130 is used to forward user data towards the wireless network edge. When running between the vAP and user device (i.e. a data plane link or data link 4140 as described herein), the data plane 4130 is used to exchange user data between the user device and the wireless network. The control plane 4120 is used for control plane information as described herein. When running between pAPs, the control plane allows pAPs to receive configuration from a controller function as described herein. When running between the vAP and the user device, the control plane 4120 allows the user device to receive updates on vAP status, bands, etc.

The control plane 4120 is used to exchange configuration information between individual pAPs participating in a given vAP, using, for example, a centralized, decentralized, or mixed controller functionality as described herein. Individual pAPs, such as the pAP1 4200, the pAP2 4300, and the pAP3 4400, can be layer 2 link aggregated into a vAP, such as the vAP 4100, using a distributed control method, centralized control method, or combinations thereof (implementations collectively referred to as "controller function"). In the centralized method, a controller 4600 and/or control software running within the network 4000, can communicate with each and every pAP and configure them accordingly, via, for example, the control plane 4120. State information is maintained in the controller 4600 and delivered to individual pAPs as control or configuration messages. In implementations, the controller 4600 can be a standalone device, integrated with the switch and/or router 4500, or combinations thereof. In implementations, the control software can be provisioned on the switch and/or router 4500. In the distributed method, a controller function is provisioned on and distributively running on each pAP, resulting in state information being maintained in all networked pAP instances in the vAP. In implementations, this can be done via the control plane 4120. In implementations, some vAP functions can be distributed (for example, spectrum band management) while other vAP functions can be centralized (for example, SSID configuration, etc.).

The control plane 4120 between the individual pAP instances, such as the pAP1 4200, the pAP2 4300, and the pAP3 4400, and the controller function exchange a number of configuration or control options for a given vAP, such as the vAP 4100. These configuration options can include, but are not limited to, identifying channels occupied by neighboring pAPs to avoid channel overlap and minimize interference, channel load maps to optimize coverage and bandwidth, SSID configuration options (name, set, identifiers, polling periods, visibility, etc.), identifiers and locators for individual pAPs already participating in the given vAP, security keys for the given vAP, including SSID passwords, etc., synchronization and timing information required for frequency and coverage management, and bandwidth load options for individual pAPs, which allows for better bandwidth management, uplink loading, etc.

Figure 6:
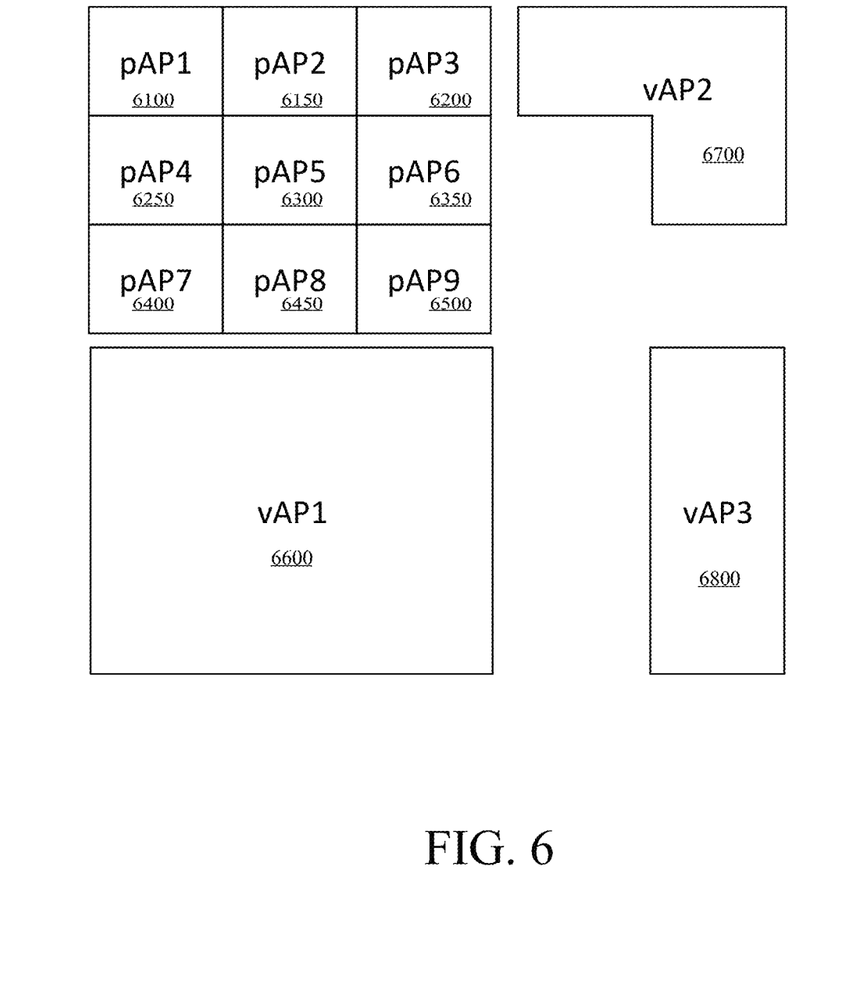
FIG. 6 is a diagram of example zones using a virtual access point in accordance with embodiments of this disclosure.

The control plane 4120 exchanges this information with all pAPs, whereby each pAP receives all necessary configuration options for each vAP it is configured to participate in as described herein with respect to FIG. 6. In implementations, the control plane 4120 message exchanges can be encrypted using 802.1AE mechanism, for example, with individual pAPs authenticating against the controller function using 802.1X authentication mechanism to improve security.

Operationally, the control plane 4120 and the data plane 4130 are established during configuration via the control function as described herein. When the user device 4050 enters the wireless coverage 4110 of the vAP 4100, the user device 4050 detects and connects to the vSSID of the vAP 4100. The user device 4050 establishes a data link 4140 with the vAP 4100 via the data plane 4130 and layer 2 control, L2LA, or logical links 4220, 4320, and 4420 with the pAP1 4200, the pAP2 4300, and the pAP3 4400, respectively, via the control plane 4120 and the data plane 4130. That is, the user device 4050 detects and connects to the vAP 4100 and not to the individual underlying physical APs.

As described herein, the control plane 4120 is used to obtain information about the pAP1 4200, the pAP2 4300, and the pAP3 4400 participating in the vAP 4100, allowing the user device 4050 to locate and track individual pAP beacon signals, and lock on to them. The user device 4050 uses the control plane connection 4130 to establish RF connectivity to each individual pAP in the vAP 4100. The user device 4050 periodically refreshes information about the pAPs participating in the vAP 4100 that the user device 4050 is connected to, maintaining an up-to-date list of such pAPs instances. The user device 4050 maintains up-to-date information on the individual pAP connections as part of user device discovery and/or when the user device 4050 loses RF coverage with respect to individual pAP instances.

The user device 4050 sends any pending data towards the pAP1 4200, the pAP2 4300, and the pAP3 4400 participating in the vAP 4100 using load balancing mechanisms. In implementations, the load balancing mechanisms are provisioned with or enabled on the data plane 4130. For example, but not limited to, the load balancing mechanism can load balance between all connected pAPs using a hashing mechanism to decide which RF link to send the given packet to, the load balancing mechanism can load balance between connected pAPs using RF link quality as a criteria to pick a cleaner RF link with less interference over RF links with more interference, the load balancing mechanism can load balance between connected pAPs using a certain subset of RF links for upstream transmission (from user device towards the wireless network) while leaving other RF links for downstream transmission (from the wireless network to the user device), to minimize channel interference and maximize throughput, and/or combinations thereof. Other load balancing and RF link selection schemes can be used without departing from the scope of the specification or the claims described herein.

Figure 5:
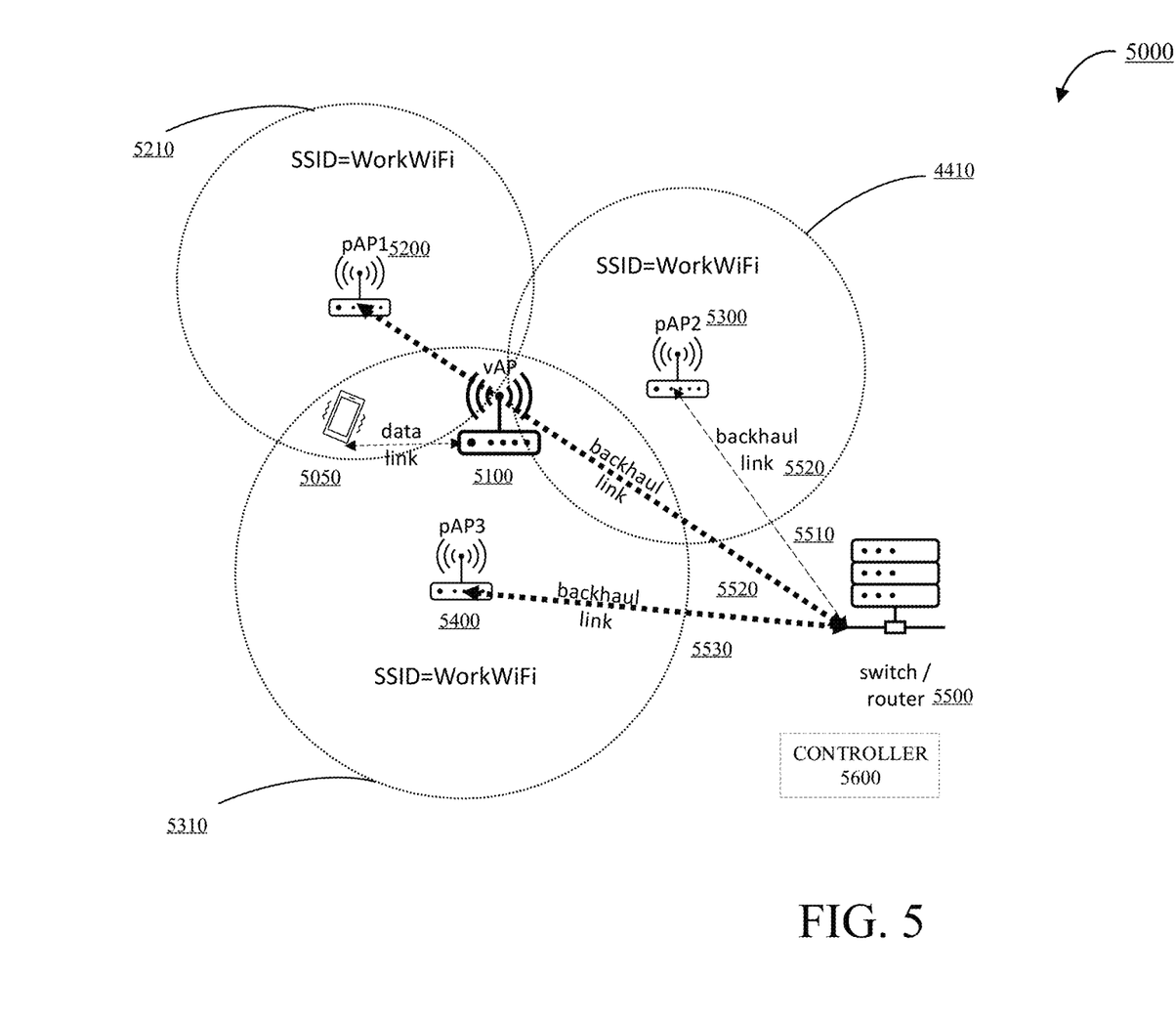
FIG. 5 is a diagram of an example load balance using a virtual access point in accordance with embodiments of this disclosure.

Referring now also to FIG. 5, described is a diagram of an example load balancing using a vAP 5100 in accordance with embodiments of this disclosure. A wireless network 5000 includes the vAP 5100 which is a L2LA of pAP1 5200, pAP2 5300, and pAP3 5400. Each of the pAP1 5200, pAP2 5300, and pAP3 5400 are connected to a switch and/or router 5500 via backhaul links 5510, 5520, and 5530, respectively, which provide access to external networks.

The user device 5050 can be, but is not limited to, client stations, user stations, client devices, end user devices, user equipment (UE), user termination devices, user terminals, personal computers (PCs), cellular telephones, Internet Protocol (IP) devices, computers, desktop computers, laptops, mobile devices, handheld computers, personal media devices, smartphones, notebooks, notepads, phablets and the like which can detect and connect to the vAP 5100 and to the pAP1 5200, pAP2 5300, and pAP3 5400 as described herein.

The switch and/or router 5500 can be, but is not limited to, a router, modem, cable modem, set top box, Internet Service Provider (ISP) system device, access point device, network devices, gateway, and the like which provides access to the external network.

The pAP1 5200, pAP2 5300, and pAP3 5400 can be an access point, an access node, or like device which enables radio communications access for the user device 5050 to the external network via the switch and/or router 5500. Each pAP1 5200, pAP2 5300, and pAP3 5400 can have or provide a wireless communications coverage 5210, 5310, and 5410, respectively. In implementations, a wireless mesh network or topology can be used for connectivity between the pAP1 5200, pAP2 5300, and pAP3 5400 and the switch and/or router 5500 in contrast to having each of the pAP1 5200, pAP2 5300, and pAP3 5400 being connected to the switch and/or router 5500. That is, a topology of the vAP 5100 can be implemented using a variety of networking techniques.

The wireless network 5000, the pAP1 5200, the pAP2 5300, the pAP3 5400, the switch and/or router 5500, the user device 5050, and a controller 5600 or control functionality include the operability and functionality as described with respect to FIG. 4.

As described herein, load balancing mechanisms can enable individual data flows to use different pAPs within the vAP 5100 to reach the user device 5050. For example, a majority of the traffic may be forwarded using the pAP1 5200 and the backhaul link 5510, which is closer to the connected user device 5050, has better signal quality, and the like, and lower traffic volume can be transmitted via the pAP3 5400 and the backhaul link 5530.

Referring now to both FIG. 4 and FIG. 5, when roaming within the vAP 4100 wireless coverage area 4110, the user device 4050 maintains the control plane 4120 and the data plane 4130 connections (that is data link 4140 and the layer 2 control links 4220, 4320, and 4420) to the vAP 4100, effectively connecting to multiple pAPs simultaneously. The controller 4600 or controller function operating between the pAP1 4200, the pAP2 4300, and the pAP3 4400 allows them to collectively decide which path (RF link and backhaul link) to use to send data to the user device 4050 in a most effective manner, using any of the load balancing mechanisms described herein. The user device 4050 can lose RF connectivity (lose visibility) of some of the pAPs, while maintaining the control plane 4120 and data plane 4130 to the vAP via the data link 4140 and the layer 2 control links 4220, 4320, and 4420, allowing for uninterrupted data exchange.

Individual pAPs that lose connectivity to the user device 4050 can enter into a non-forwarding mode on the data plane 4130 but continue to participate in the control plane 4120 for the given vAP instance. This allows these pAPs to rapidly switch to a forwarding mode on the data plane 4130 when RF connectivity to the user device 4050 is re-established (the user device 4050 re-enters the pAP coverage area again). That is, access point information and the like do not need to be re-established or reconfigured (as needed during an initial configuration or initialization) for the previously non-forwarding mode physical access point. For example, in FIG. 5, the pAP1 5200 and the pAP3 5400 are used to deliver data to the user device 5050, while the pAP2 5300 is in a non-forwarding mode on the data plane.

FIG. 6 is a diagram of example zones using a vAP in accordance with embodiments of this disclosure. As described herein, a vAP includes a layer 2 aggregated set of pAPs. The same set of pAPs may participate in a number of different vAPs, with each vAP covering the same or different subsets of pAPs. For example, assume there are 9 pAPs, pAP1 6100, PAP2 6150, pAP3 6200, pAP4 6250, pAP5 6300, pAP6 6350, pAP7 6400, pAP8 6450, and pAP9 6500. Based on these 9 pAPs, there are many combinations which can be used to generate vAPs. In implementations, vAP1 6600 can include all 9 pAPs, vAP2 6700 can include the pAP2 6150, the pAP3 6200, and the pAP6 6350, and vAP3 6800 can include the pAP3 6200, the pAP6 6350, and the pAP9 6500. Any pAP can participate in more than one vAP at any time, whereby the pAP would then receive and transmit on multiple vAP SSIDs on allocated channels, as configured using the controller function.

Figure 7:
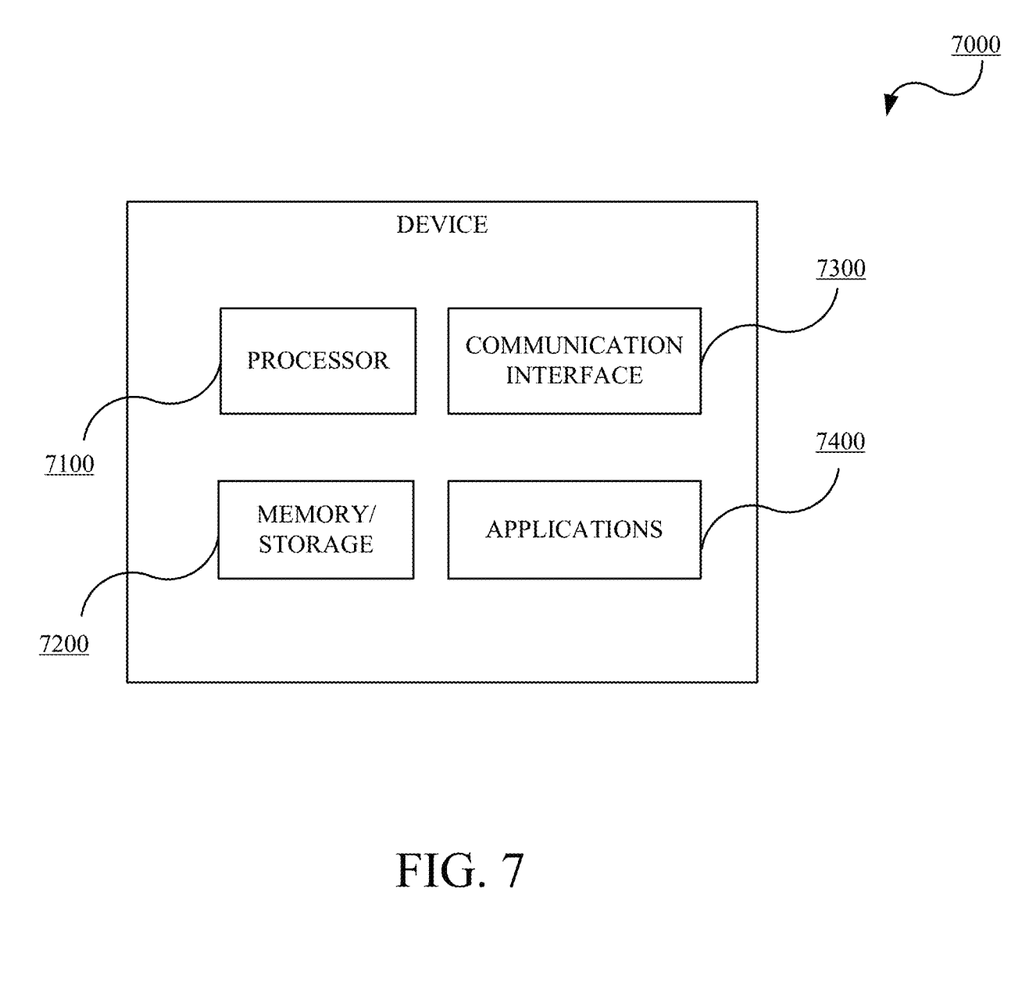
FIG. 7 is a block diagram of an example device in accordance with embodiments of this disclosure.

FIG. 7 is a block diagram of an example of a device 7000 in accordance with embodiments of this disclosure. The device 7000 may include, but is not limited to, a processor 7100, a memory/storage 7200, a communication interface 7300, and applications 7400. The device 7000 may include or implement, for example, the user device 4050, the vAP 4100, the pAP1 4200, the pAP2 4300, the pAP3 4400, the switch and/or router 4500, the controller 4600, the vAP 5100, the pAP1 5200, the pAP2 5300, the pAP3 5400, the switch and/or router 5500, the controller 5600, the user device 5050, the pAP1 6100, the pAP2 6150, the pAP3 6200, the pAP4 6250, the pAP5 6300, the pAP6 6350, the pAP7 6400, the pAP8 6450, the pAP9 6500, the vAP1 6600, the vAP2 6700, and the vAP3 6800. In implementations, appropriate memory/storage 7200 may store the configuration information, pAP signal strength information, and the like. In implementations, appropriate applications 7400 can include control functionality software as described herein. In implementations, appropriate memory/storage 7200 is encoded with instructions for at least configuring, controlling, and managing the methods and techniques described herein. The techniques or methods described herein may be stored in appropriate memory/storage 7200 and executed by the appropriate processor 7100 in cooperation with the memory/storage 7200, the communications interface 7300, and applications 7400, as appropriate. The device 7000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 8:
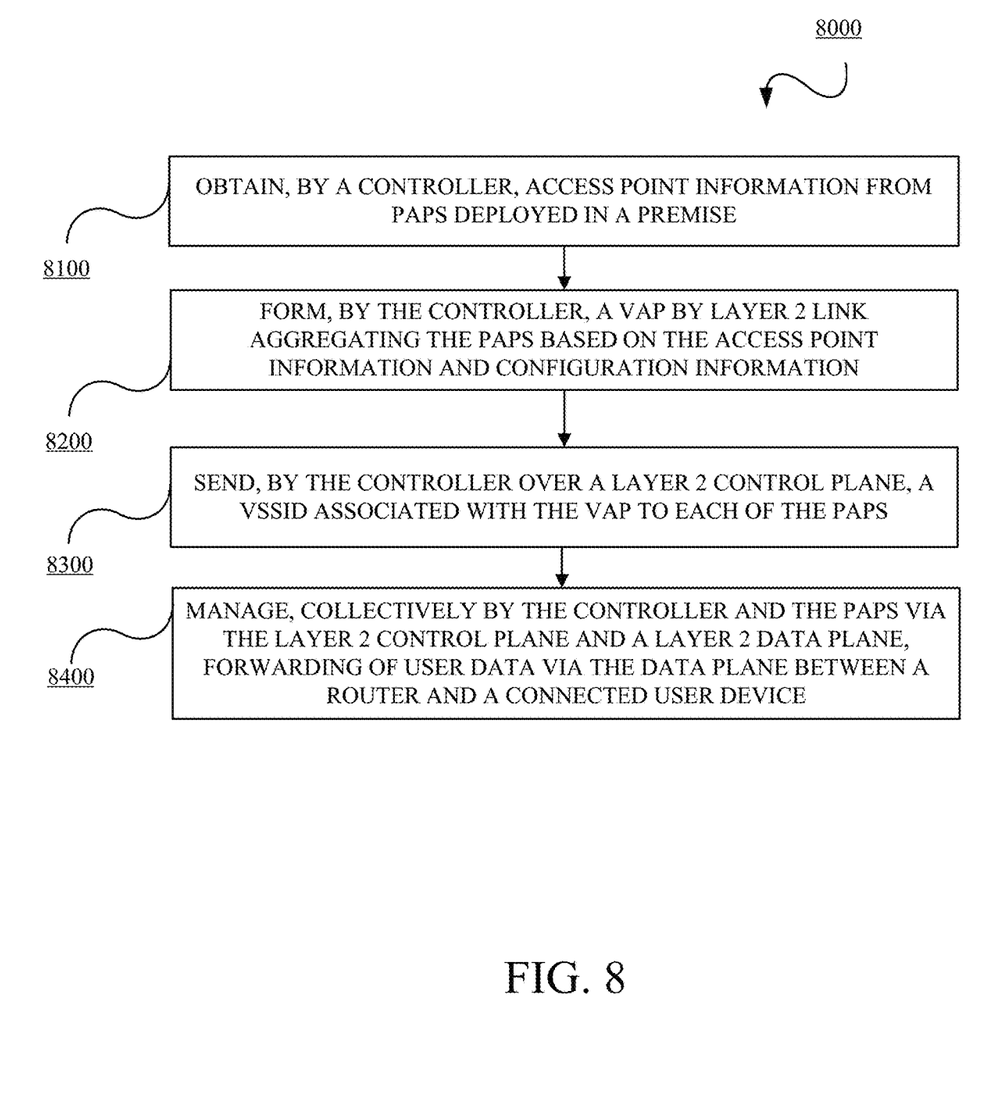
FIG. 8 is a flowchart of an example method for providing a virtual access point in accordance with embodiments of this disclosure.

FIG. 8 is a flowchart of an example method 8000 for establishing a vAP in accordance with embodiments of this disclosure. The method 8000 includes: obtaining 8100, by a controller, access point information from pAPs deployed in a premise; forming 8200, by the controller, a vAP by layer 2 link aggregating the pAPs based on the access point information and configuration information; sending 8300, by the controller over a layer 2 control plane, a vSSID associated with the vAP to each of the pAPs; and managing 8400, collectively by the controller and the pAPs via the layer 2 control plane and a layer 2 data plane, forwarding of user data via the data plane between a router and a connected user device. For example, the method 8000 may be implemented, as applicable and appropriate, by the user device 4050, the vAP 4100, the pAP1 4200, the pAP2 4300, the pAP3 4400, the switch and/or router 4500, the controller 4600, the vAP 5100, the pAP1 5200, the pAP2 5300, the pAP3 5400, the switch and/or router 5500, the controller 5600, the user device 5050, the pAP1 6100, the pAP2 6150, the pAP3 6200, the pAP4 6250, the pAP5 6300, the pAP6 6350, the pAP7 6400, the pAP8 6450, the pAP9 6500, the vAP1 6600, the vAP2 6700, the vAP3 6800, the device 7000, the processor 7100, the memory/storage 7200, the communication interface 7300, and the applications 7400.

The method 8000 includes obtaining 8100, by a controller, access point information from pAPs deployed in a premises. In implementations, a controller can be deployed as a standalone device in the premises, as integrated with a router, switch, or like device, as distributive control software on pAPs deployed in the premises, and/or combinations thereof. The controller can collect or obtain access point information from the pAPs deployed in the premises. The access point information can include, but is not limited, to MAC address, operating frequency range, identifiers, and the like.

The method 8000 includes forming 8200, by the controller, a vAP by layer 2 link aggregating the pAPs based on the access point information and configuration information. A layer 2 link aggregation of the deployed pAPs is formed based on the access point information and the configuration information. The formation of the layer 2 link aggregation includes establishing a layer 2 control plane and a layer 2 data plane which function and operate as described herein. In implementations, in addition to the configuration information described herein, the configuration information can also include user parameters for defining which pAPs to include in a vAP, for defining a zone or sector of coverage, or combinations thereof. In implementations, restrictions, limitations, security, and other parameters can be included in defining the vAP.

The method 8000 includes sending 8300, by the controller over a layer 2 control plane, a vSSID associated with the vAP to each of the pAPs. A vSSID is generated for the vAP which is transmitted in the wireless coverage area of the vAP and/or the wireless coverage areas of the pAPs comprising the vAP.

The method 8000 includes managing 8400, collectively by the controller and the pAPs via the layer 2 control plane and a layer 2 data plane, forwarding of user data via a data plane between a router and a connected user device. A user device detects the vSSID and connects to the vAP via a data link to the layer 2 data plane and via layer 2 control links to each of the pAPs in the vAP. As described herein, the user device uses the layer 2 control links to obtain information about each of the pAPs to establish RF links with each of the pAPs. In implementations, the information is refreshed or updated as needed, periodically, or combinations thereof. In implementations, load balancing mechanisms can be used to manage traffic flow amongst the pAPs. In implementations, when the user device loses RF connectivity with a pAP (becoming a non-forwarding pAP with respect to the user device), user data is forwarded using the remaining RF connected pAPs (forwarding pAPs with respect to the user device) without having to connect to another pAP and perform a handover. The data link to the layer 2 data plane and the layer 2 control links remain in place despite loss of RF connectivity to a particular pAP in the vAP, which allows use of the other RF connections to send the data. From the perspective of the user device, the forwarding of the user data is being performed by the vAP without service interruption or performance degradation.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

In general, a wireless local area network includes a router configured to provide access to external networks, a plurality of physical access points connected to the router, each physical access point configured to provide radio communications access to a user device, and a controller. The controller is configured to obtain access point information from each of the plurality of physical access points, form a virtual access point by layer two link aggregating the plurality of physical access points using the access point information and configuration information, the virtual access point having a layer two data plane and a layer two control plane, generate a virtual service set identifier for the virtual access point, and send the virtual service set identifier to each of the plurality of physical access points. The virtual access point is configured to provide a wireless coverage area equivalent to at least the plurality of physical access points using the virtual service set identifier, enable a user device to connect to the layer two data plane via a data link, enable the user device to connect to the layer two control place via layer 2 control links, and enable the user device to radio frequency connect to the plurality of physical access points. The controller and the plurality of physical access points are configured to manage user data traffic flow between the router and the user device via the layer 2 control plane and the layer 2 data plane. In implementations, the layer two data plane is provisioned with load balancing mechanisms to efficiently manage user data traffic flow between the plurality of physical access points and the router. In implementations, the controller and the plurality of physical access points further configured to switch a physical access point to a non-forwarding mode when the user device loses a radio frequency connection with the physical access point, and wherein a non-forwarding mode physical access point is a non-participant with respect to the layer 2 data plane and a participant with respect to the layer 2 control plane. In implementations, the controller and the plurality of physical access points further configured to switch the non-forwarding mode physical access point to a forwarding mode when the radio frequency connection is re-established with the user device. In implementations, the virtual access point further configured to provide a forwarding mode and a non-forwarding for a physical access point with respect to the user device, the forwarding mode enabling participation on the layer 2 data plane and the layer 2 control plane to forward user data traffic flow and the non-forwarding mode enabling participation on the layer 2 control plane to enable switching to the forwarding mode absent initialization configuration. In implementations, the controller and the router are an integrated device. In implementations, some functionality of the controller is distributively provisioned amongst the plurality of physical access points. In implementations, the controller is distributively provisioned amongst the plurality of physical access points. In implementations, the controller is further configured to form multiple virtual access points using subsets of the plurality of physical access points.

In general, a method for provisioning a virtual access point includes collecting, by a controller, wireless access point information from physical access points deployed in a premise, layer 2 link aggregating, by the controller, the physical access points using the wireless access point information and configuration data to form a virtual access point, sending, by the controller over a control plane of the virtual access point, a virtual service set identifier associated with the virtual access point to each of the physical access point, and managing, collectively by the controller and the physical access points via the control plane and a data plane of the virtual access point, forwarding of user data via the data plane between a router and a user device connected to the virtual access point. In implementations, the method further includes establishing, by the controller, the control plane and data plane between the physical access points. In implementations, the method further includes generating, by the controller, the virtual service set identifier. In implementations, the method further includes configuring, by the controller, load access software on the data plane to manage communication of the user data. In implementations, the method further includes enabling a user device to connect to the data plane via a data link with the virtual access point. In implementations, the method further includes enabling a user device to connect to the control plane via control link to each of the physical access points. In implementations, the method further includes enabling a user device to establish radio frequency connections to the physical access points. In implementations, the method further includes switching between a forwarding mode and a non-forwarding mode for a physical access point when a radio frequency connection is lost between the user device and physical access point, wherein the physical access point is passive with respect to the data plane and active with respect to the control plane. In implementations, the method further includes forming, by the controller, multiple virtual access points by grouping different ones of the physical access points.

In general, a method for virtual access point networking includes establishing, by a controller, a virtual access node by layer two link aggregation of multiple physical access nodes deployed in a location and connected to a router, the virtual access node having a virtual service set identifier, a layer two data plane, and a layer two control plane, detecting, by a client station, the virtual service set identifier after entering a wireless coverage area of the virtual access node, connecting, by the client station, to the virtual access node via a data link to the layer two data plane, connecting, by the client station, to the multiple physical access nodes via control links to the layer two control plane, establishing, by the client station, radio frequency connections to the multiple physical access nodes based on information obtained via the control plane, and exchanging data between the user device, the multiple physical access nodes, and the router via traffic management using the layer two data plane and the layer two control plane. In implementations, the method further includes switching between a forwarding mode and a non-forwarding mode for a physical access point when a radio frequency connection is lost between the client station and a physical access point, wherein the physical access point is passive with respect to the layer 2 data plane and maintained with respect to the layer two control plane.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A wireless local area network, comprising:
a plurality of physical access points connected to a router configured to provide access to external networks, each physical access point configured to provide radio communications access to a user device;
a controller configured to form a virtual access point with a layer two data plane, a layer two control plane, and a virtual service set identifier by layer two link aggregating the plurality of physical access points;
the virtual access point configured to provide a forwarding mode and a non-forwarding mode for a physical access point with respect to the user device, the forwarding mode enables participation on the layer two data plane and the layer two control plane to forward user data traffic flow and the non-forwarding mode enables participation on the layer two control plane to enable switching to the forwarding mode absent an initialization configuration; and
the controller and the plurality of physical access points configured to manage user data traffic flow between the router and the user device via the layer two control plane and the layer two data plane.

2. The wireless local area network of claim 1, wherein the physical access point in the non-forwarding mode is a non-participant with respect to the layer two data plane.

3. The wireless local area network of claim 1, wherein the controller and the plurality of physical access points are further configured to switch a physical access point to the non-forwarding mode when the user device loses a radio frequency connection with the physical access point.

4. The wireless local area network of claim 3, wherein the controller and the plurality of physical access points further configured to switch the physical access point in the non-forwarding mode to the forwarding mode when the radio frequency connection is re-established with the user device.

5. The wireless local area network of claim 1, wherein the controller and the router are an integrated device.

6. The wireless local area network of claim 1, wherein some functionality of the controller is distributively provisioned amongst the plurality of physical access points.

7. The wireless local area network of claim 1, wherein the controller is distributively provisioned amongst the plurality of physical access points.

8. The wireless local area network of claim 1, wherein the controller is further configured to form multiple virtual access points using subsets of the plurality of physical access points.

9. A method for provisioning a virtual access point, the method comprising:
forming, by a controller, a virtual access point by layer two link aggregating a plurality of physical access points which are connected to a router configured to provide access to external networks and wherein each physical access point is configured to provide radio communications access to a user device, the virtual access point having a layer two data plane and a layer two control plane;
providing, by the virtual access point, a forwarding mode and a non-forwarding mode for a physical access point with respect to the user device, wherein the physical access point is a non-participant with respect to the layer two data plane and a participant with respect to the layer two control plane when in the non-forwarding mode; and switching, by the controller and the plurality of physical access points, the physical access point to the forwarding mode from the non-forwarding mode when a radio frequency connection is established between the physical access point and the user device.

10. The method of claim 9, the method further comprising:

enabling, by the virtual access point, the user device to connect to the layer two data plane via a data link.

11. The method of claim 9, the method further comprising:

enabling, by the virtual access point, the user device to connect to the layer two control plane via a control link.

12. The method of claim 9, the method further comprising:

enabling, by the virtual access point, the user device to radio frequency connect to the plurality of physical access points.

13. The method of claim 9, wherein the layer two data plane is provisioned with load balancing mechanisms to efficiently manage user data traffic flow between the plurality of physical access points and the router.

14. The method of claim 9, the method further comprising:

switching, by the controller and the plurality of physical access points, a physical access point to the non-forwarding mode when the user device loses a radio frequency connection with the physical access point.

15. The method of claim 9, wherein the forwarding mode enables participation on the layer two data plane and the layer two control plane and the non-forwarding mode enables switching to the forwarding mode absent an initialization configuration.

16. The method of claim 9, the method further comprising:

forming, by the controller, multiple virtual access points using subsets of the plurality of physical access points.

17. The method of claim 9, wherein the controller is distributively provisioned amongst the plurality of physical access points.

18. A method for virtual access point networking, the method comprising:

establishing, by a controller, a virtual access node by layer two link aggregation of multiple physical access nodes deployed in a location and connected to a router, the virtual access node having a layer two data plane and a layer two control plane; and providing, by the virtual access node, a forwarding mode and a non-forwarding mode for a physical access point with respect to a client station, wherein the forwarding mode enables participation on the layer two data plane and the layer two control plane to forward user data traffic flow and the non-forwarding mode enables participation on the layer two control plane to enable switching to the forwarding mode absent an initialization configuration.

19. The method of claim 18, the method further comprising:

switching, by the controller and the multiple physical access nodes, the physical access point to the non-forwarding mode from the forwarding mode when a radio frequency connection is lost between the physical access point and the client station.

20. The method of claim 19, the method further comprising:

switching, by the controller and the multiple physical access nodes, the physical access point to the forwarding mode from the non-forwarding mode when a radio frequency connection is re-established between the physical access point and the client station.

* * * * *